US012036670B2

(12) United States Patent
Geating et al.

(10) Patent No.: US 12,036,670 B2
(45) Date of Patent: Jul. 16, 2024

(54) SYSTEMS AND METHODS FOR ACTUATION OF A ROBOTIC MANIPULATOR

(71) Applicant: Boston Dynamics, Inc., Waltham, MA (US)

(72) Inventors: Joshua Timothy Geating, Allston, MA (US); Geoffrey Peyton, Arlington, MA (US); Christopher Everett Thorne, Waltham, MA (US); Jacob Webb, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/990,292

(22) Filed: Nov. 18, 2022

(65) Prior Publication Data

US 2023/0182287 A1 Jun. 15, 2023

Related U.S. Application Data

(60) Provisional application No. 63/288,373, filed on Dec. 10, 2021.

(51) Int. Cl.
*B25J 17/02* (2006.01)
*B25J 9/10* (2006.01)

(52) U.S. Cl.
CPC ............... *B25J 9/106* (2013.01); *B25J 17/02* (2013.01)

(58) Field of Classification Search
CPC ... B25J 9/102; B25J 9/126; B25J 9/146; B25J 9/106; B25J 17/02; B25J 17/0241
See application file for complete search history.

(56) References Cited

U.S. PATENT DOCUMENTS 4,671,732 A * 6/1987 Gorman ................. B25J 19/002
901/29
5,523,662 A * 6/1996 Goldenberg ........... B25J 17/025
901/23

(Continued)

FOREIGN PATENT DOCUMENTS

KR 1020180129020 A 12/2018

OTHER PUBLICATIONS

Annex of the Partial International Search 'Invitation to Pay Additional Fees' from the International Searching Authority for International Application No. PCT/US2022/050438, dated Mar. 29, 2023.

(Continued)

*Primary Examiner* — Gregory Robert Weber
(74) *Attorney, Agent, or Firm* — PIERCE ATWOOD LLP (57) ABSTRACT

Disclosed herein are systems and methods directed to an industrial robot that can perform mobile manipulation (e.g., dexterous mobile manipulation). A robotic arm may be capable of precise control when reaching into tight spaces, may be robust to impacts and collisions, and/or may limit the mass of the robotic arm to reduce the load on the battery and increase runtime. A robotic arm may include differently configured proximal joints and/or distal joints. Proximal joints may be designed to promote modularity and may include separate functional units, such as modular actuators, encoder, bearings, and/or clutches. Distal joints may be designed to promote integration and may include offset actuators to enable a through-bore for the internal routing of vacuum, power, and signal connections.

12 Claims, 9 Drawing Sheets

(56) References Cited

U.S. PATENT DOCUMENTS

| | | | |
|---|---|---|---|
| 9,044,865 B2* | 6/2015 | Goldenberg | B25J 9/08 |
| 9,844,447 B2* | 12/2017 | van der Merwe | A61F 2/68 |
| 10,253,855 B2* | 4/2019 | Potter | B25J 9/108 |
| 10,369,016 B2* | 8/2019 | Lipsey | A61F 2/582 |
| 10,369,024 B2* | 8/2019 | Gill | A61F 2/72 |
| 10,632,628 B2* | 4/2020 | Hasuo | B25J 19/0066 |
| 10,919,159 B2* | 2/2021 | Kassow | B25J 19/02 |
| 11,376,729 B2* | 7/2022 | Naitou | B25J 18/04 |
| 2017/0184425 A1* | 6/2017 | Mitsuhashi | G01D 5/34707 |
| 2018/0297216 A1* | 10/2018 | Nagatsuka | B25J 17/00 |
| 2018/0319012 A1 | 11/2018 | He et al. | |
| 2019/0047161 A1* | 2/2019 | Noda | A61H 1/0274 |
| 2020/0298422 A1* | 9/2020 | Ayuzawa | B25J 9/102 |
| 2022/0234220 A1* | 7/2022 | Hama | B25J 9/0009 |

OTHER PUBLICATIONS

International Search Report and Written Opinion of the International Searching Authority for International Application No. PCT/US2022/050438, dated May 24, 2023.

Wedler, et al., "DLR's Dynamic Actuator Modules for Robotic Space Applications", Proceedings of the 41st Aerospace Mechanisms Symposium, May 18, 2012, pp. 223-237, XP093032155, retrieved from the Internet: https://esmats.eu/amspapers/pastpapers/pdfs/2012/wedler.pdf [retrieved on Mar. 16, 2023].

* cited by examiner

SYSTEMS AND METHODS FOR ACTUATION OF A ROBOTIC MANIPULATOR

CROSS REFERENCE TO RELATED APPLICATIONS

This application claims the benefit under 35 U.S.C. § 119(e) of U.S. Provisional application No. 63/288,373, filed Dec. 10, 2021, and entitled, "SYSTEMS AND METHODS FOR ACTUATION OF A ROBOTIC MANIPULATOR," the disclosure of which is incorporated by reference in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Disclosed herein are systems and methods directed to an industrial robot that can perform mobile manipulation (e.g., dexterous mobile manipulation) in tight, unstructured environments while operating on battery power. To enable such capabilities, a robotic arm may be capable of precise control when reaching into tight spaces, may be robust to impacts and collisions, and/or may limit the mass of the robotic arm to reduce the load on the battery and increase runtime. Some embodiments of a robotic arm include differently configured proximal joints and/or distal joints. Proximal joints may be designed to promote modularity and may include separate functional units, such as modular actuators, encoders, bearings, and/or clutches. Distal joints may be designed to promote integration and may include offset actuators to enable a through-bore for the internal routing of vacuum, power, and signal connections.

One aspect of the disclosure provides a modular joint for coupling a first link of a robotic arm and a second link of the robotic arm. The joint comprises an actuator configured to be removably coupled to the first link of the robotic arm, the actuator comprising an output shaft configured to rotate about a first axis; a bearing configured to be removably coupled to the second link of the robotic arm and configured to enable rotation of the second link about the first axis; and an encoder configured to measure an angle of the second link relative to the first link.

In another aspect, the encoder is removably coupled to the bearing.

In another aspect, the joint further comprises a tolerance ring disposed between the external diameter of the output shaft of the actuator and the second link, the tolerance ring configured to slip relative to the output shaft of the actuator when a torque of the second link exceeds a threshold torque.

In another aspect, the actuator comprises a brushless motor.

In another aspect, the actuator comprises a strain wave gearbox.

In another aspect, the actuator comprises a cycloidal gearbox.

In another aspect, the bearing comprises a cross roller bearing.

In another aspect, the bearing comprises an axial contact bearing.

In another aspect, the actuator comprises a brake configured to arrest rotation of the actuator.

One aspect of the disclosure provides a joint for a robotic arm. The joint comprises an actuator configured to rotate an output of the actuator about a first axis; a first gear fixedly coupled to the output of the actuator and configured to rotate about the first axis; and a second gear operatively coupled to the first gear, wherein rotation of the first gear about the first axis rotates the second gear about a second axis offset from the first axis. The second gear comprises a through-bore passing from a first side of the second gear to a second side of the second gear opposite the first side, the through-bore configured to enable passage of one or more connections from the first side to the second side of the second gear.

In another aspect, the actuator comprises a brushless motor.

In another aspect, the actuator comprises a strain wave gearbox.

In another aspect, the actuator comprises a cycloidal gearbox.

In another aspect, the first gear comprises a first helical gear, and the second gear comprises a second helical gear.

In another aspect, the joint further comprises a tolerance ring disposed between the output of the actuator and the first gear, the tolerance ring configured to slip relative to the first gear when a torque of the first gear exceeds a threshold torque.

In another aspect, the joint further comprises an encoder configured to sense an angular position of the second gear.

In another aspect, the one or more connections comprises one or more of a power cable, a vacuum cable, and a signal cable.

In another aspect, the one or more connections comprises at least one power cable, at least one vacuum cable, and at least one signal cable.

In another aspect, the joint further comprises a first link of the robotic arm fixedly coupled to the actuator; and a second link of the robotic arm fixedly coupled to the second gear.

One aspect of the disclosure provides a robotic arm. The robotic arm comprises a base; an end effector; a proximal portion comprising a plurality of proximal links and a plurality of proximal joints, each of the plurality of proximal links coupled to at least one of the plurality of proximal joints; a distal portion comprising a plurality of distal links and a plurality of distal joints, each of the plurality of distal links coupled to at least one of the plurality of distal joints; and one or more connections extending from the base to the end effector, wherein the one or more connections are routed externally to the plurality of proximal links and internally to the plurality of distal links.

In another aspect, each of the plurality of distal joints is configured to rotate about a respective distal joint axis, and wherein each of the plurality of distal joints comprises a through-bore aligned with the respective distal joint axis.

In another aspect, the one or more connections extending from the base to the end effector is disposed at least partially within each of the respective through-bores of the plurality of distal joints.

In another aspect, the robotic arm comprises at least six degrees of freedom.

In another aspect, the robotic arm comprises at least seven degrees of freedom.

In another aspect, the plurality of proximal links comprises a first proximal link, a second proximal link, and a proximal third link. The plurality of proximal joints comprises a first proximal joint, a second proximal joint, and a third proximal joint. The first proximal joint comprises a first proximal actuator configured to rotate the first proximal link relative to the base about a first proximal joint axis. The second proximal joint comprises a second proximal actuator configured to rotate the second proximal link relative to the first proximal link about a second proximal joint axis. The third proximal joint comprises a third proximal actuator configured to rotate the third proximal link relative to the second proximal link about a third proximal joint axis. The first, second, and third proximal joint axes are parallel.

In another aspect, the distal portion comprises a spherical wrist.

In another aspect, the spherical wrist comprises: a first distal joint comprising a first distal actuator configured to rotate the end effector relative to a link about a first distal joint axis; a second distal joint comprising a second distal actuator configured to rotate the end effector relative to the link about a second distal joint axis; and a third distal joint comprising a third distal actuator configured to rotate the end effector relative to the link about a third distal joint axis. The first, second, and third distal joint axes are mutually perpendicular. The first, second, and third distal joint axes intersect.

In another aspect, the end effector is a vacuum-based end effector, and a vacuum cable coupled to the vacuum-based end effector is routed through the spherical wrist.

In another aspect, the vacuum cable is routed through the intersection of the first, second, and third distal joint axes of the spherical wrist.

In another aspect, each of the plurality of proximal joints comprises a brake configured to arrest rotation of a respective proximal actuator.

In another aspect, the base comprises a mobile base.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialist robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialist robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

Example Robot Overview

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1A:
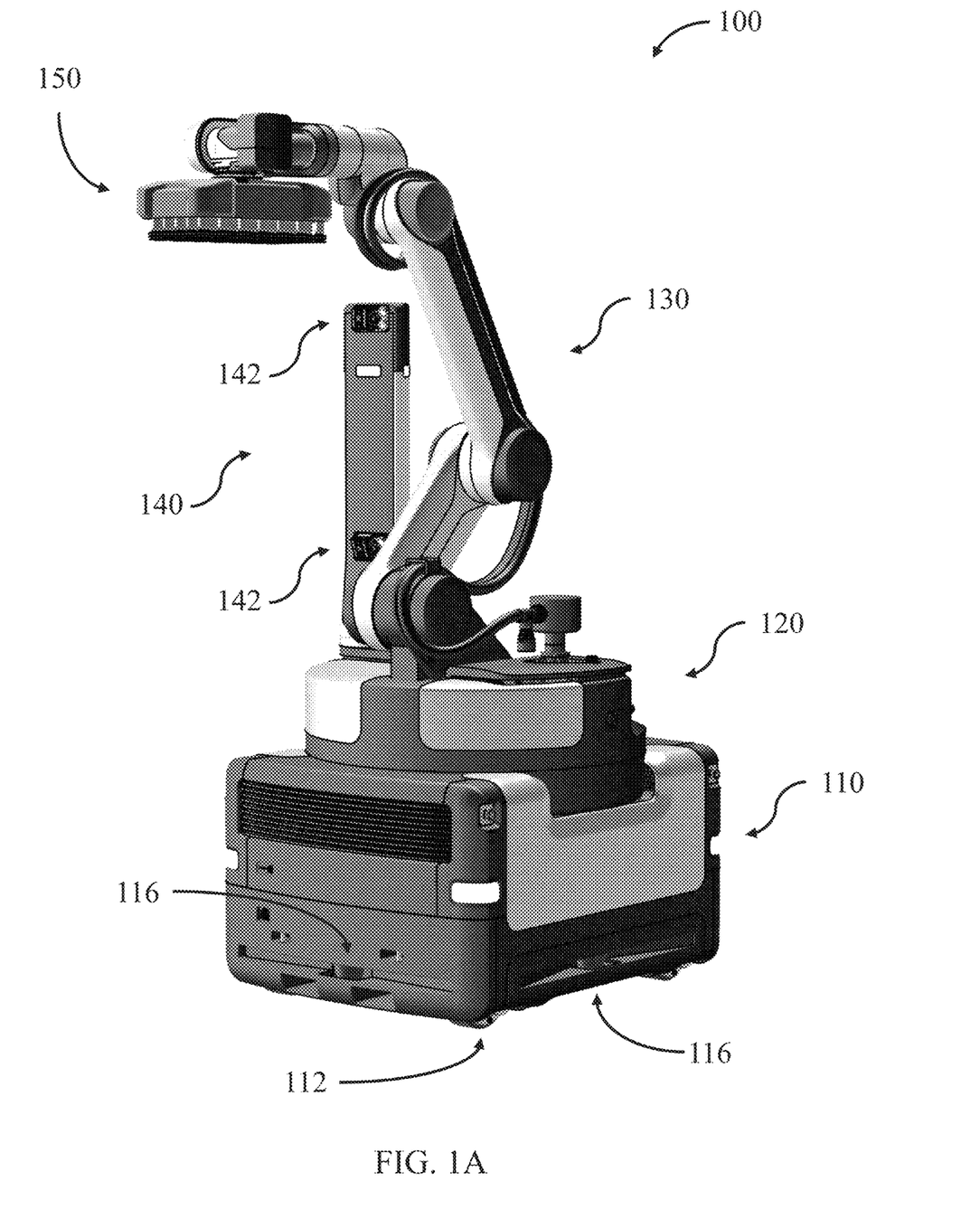
FIG. 1A is a perspective view of one embodiment of a robot.
Figure 1B:
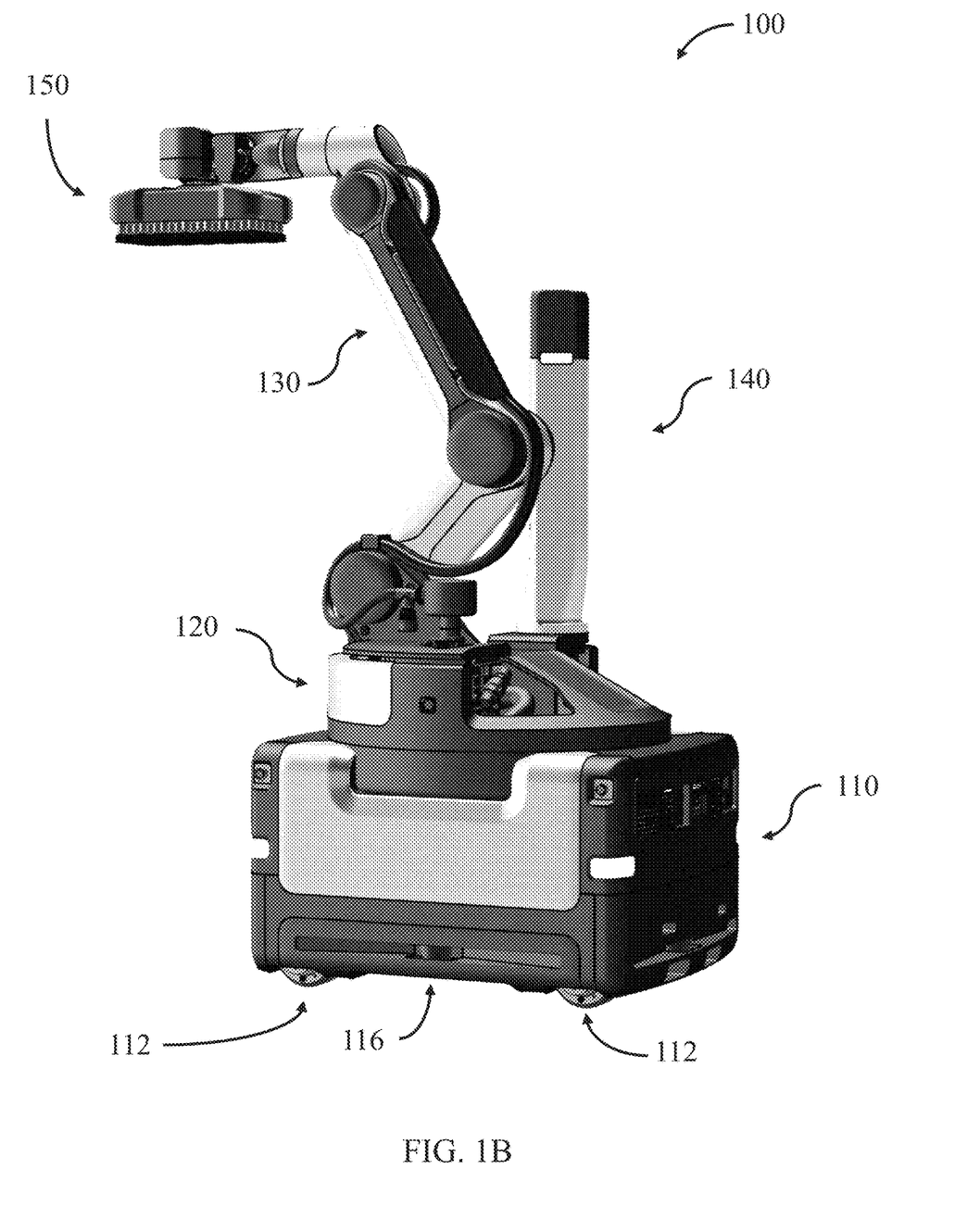
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
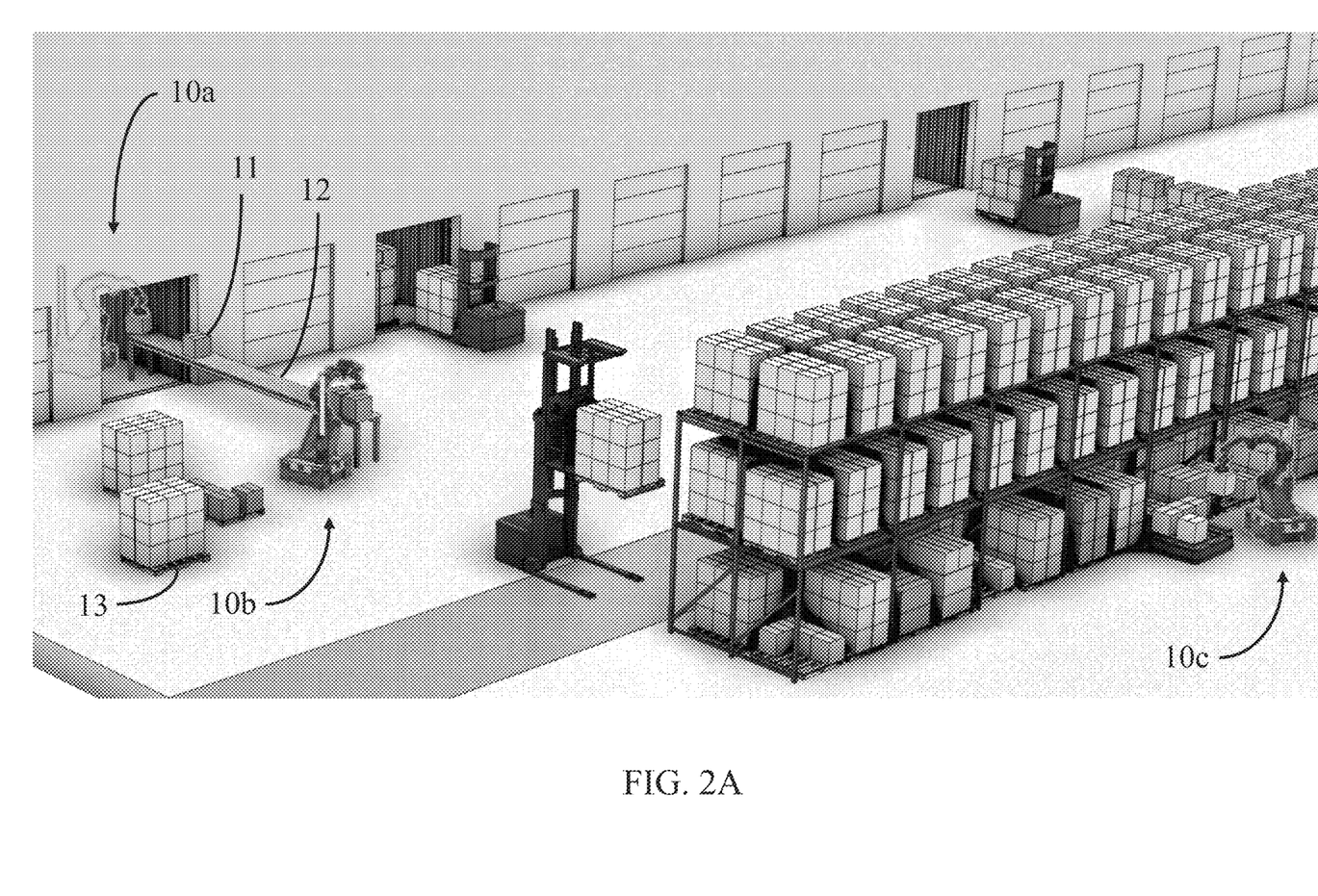
FIG. 2A depicts robots performing tasks in a warehouse environment.

FIG. 2A depicts robots 10a, 10b, and 10c performing different tasks within a warehouse environment. A first robot 10a is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10b organizes the boxes 11 onto a pallet 13. In a separate area of the warehouse, a third robot 10c picks boxes from shelving to build an order on a pallet (this particular task will be discussed in greater detail below in reference to FIG. 2C). It should be appreciated that the robots 10a, 10b, and 10c are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
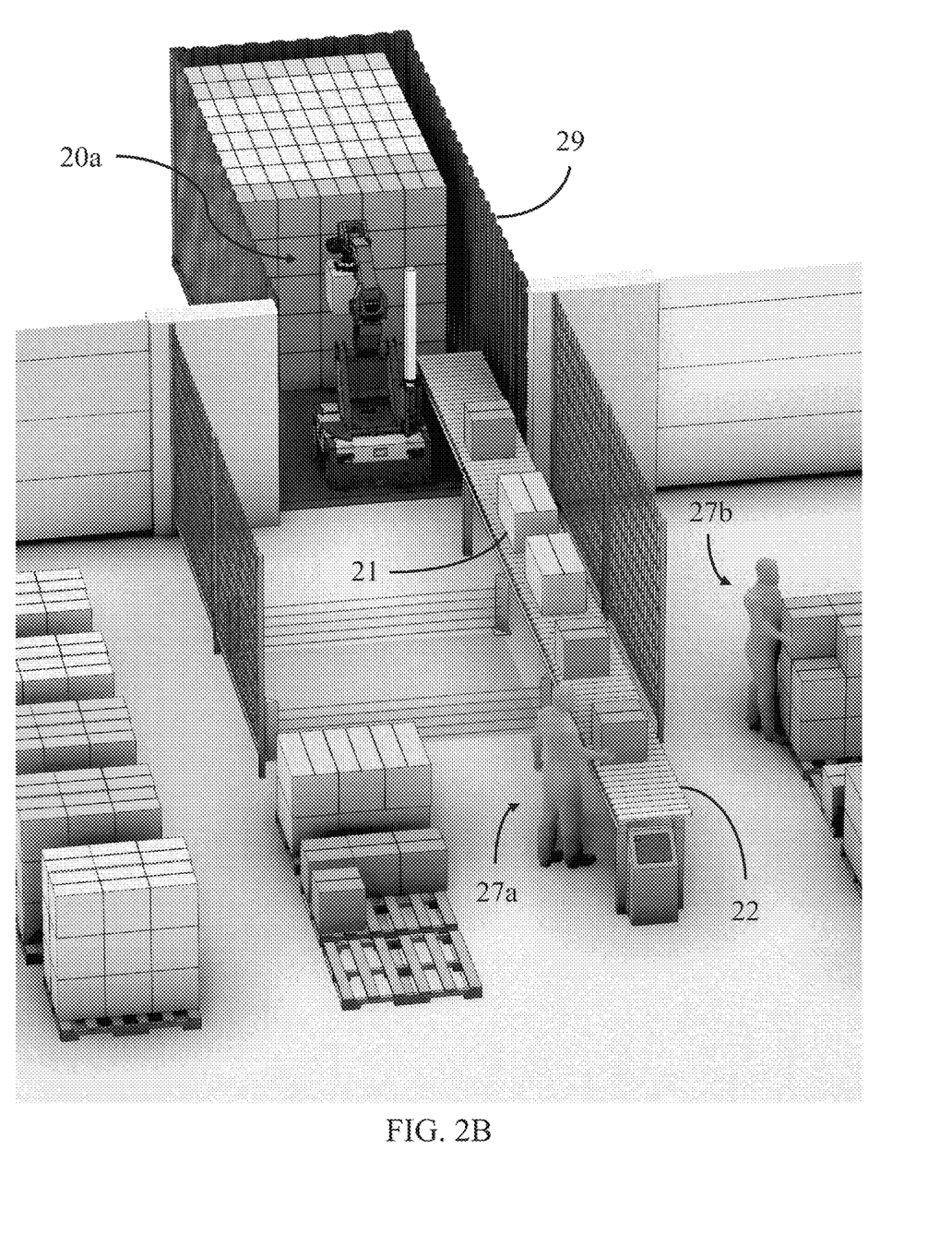
FIG. 2B depicts a robot unloading boxes from a truck.

FIG. 2B depicts a robot 20a unloading boxes 21 from a truck 29 and placing them on a conveyor belt 22. In this box picking application (as well as in other box picking applications), the robot 20a will repetitiously pick a box, rotate, place the box, and rotate back to pick the next box. Although robot 20a of FIG. 2B is a different embodiment from robot 100 of FIGS. 1A and 1B, referring to the components of robot 100 identified in FIGS. 1A and 1B will ease explanation of the operation of the robot 20a in FIG. 2B. During operation, the perception mast of robot 20a (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20a to plan its next movement while simultaneously executing a current movement. For example, while the robot 20a is picking a first box from the stack of boxes in the truck 29, the perception modules on the perception mast may point at and gather information about the location where the first box is to be placed (e.g., the conveyor belt 22). Then, after the turntable rotates and while the robot 20a is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20a may parallelize tasks which may otherwise have been performed sequentially, thus enabling faster and more efficient operation.

Also of note in FIG. 2B is that the robot 20a is working alongside humans (e.g., workers 27a and 27b). Given that the robot 20a is configured to perform many tasks that have traditionally been performed by humans, the robot 20a is designed to have a small footprint, both to enable access to areas designed to be accessed by humans, and to minimize the size of a safety zone around the robot into which humans are prevented from entering.

Figure 2C:
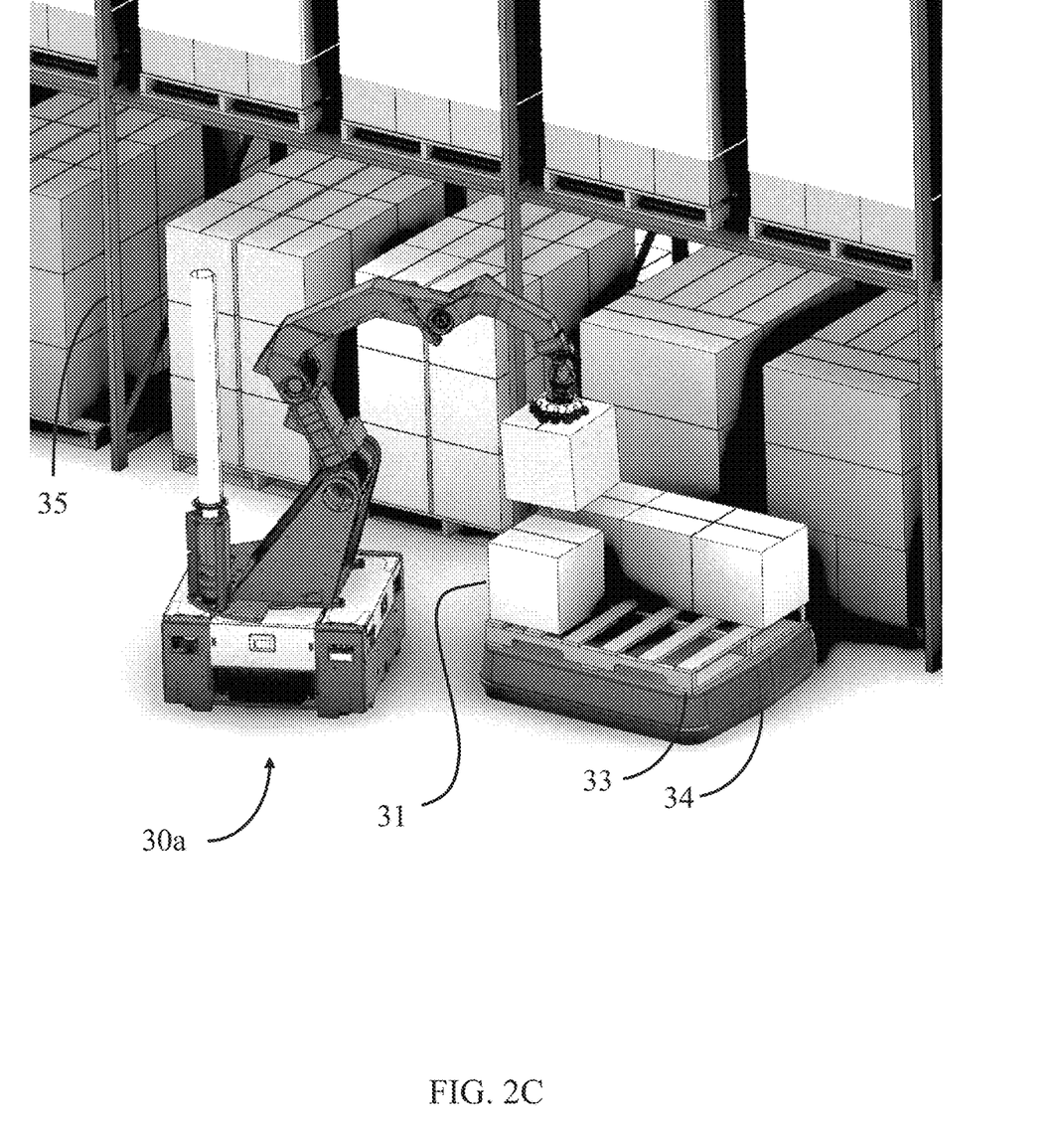
FIG. 2C depicts a robot building a pallet in a warehouse aisle.

FIG. 2C depicts a robot 30a performing an order building task, in which the robot 30a places boxes 31 onto a pallet 33. In FIG. 2C, the pallet 33 is disposed on top of an autonomous mobile robot (AMR) 34, but it should be appreciated that the capabilities of the robot 30a described in this example apply to building pallets not associated with an AMR. In this task, the robot 30a picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Example Robotic Manipulator

As described above, a robot may be tasked with performing dexterous mobile manipulation in tight, unstructured environments while operating on battery power. To enable such functionality, the arm of the robot may include certain features and/or be subject to certain design considerations. In some embodiments, the arm may be designed to be capable of precise control when reaching into tight spaces. In some embodiments, the arm may be designed to be robust to impacts, such as catching on obstacles, which is a common occurrence in many warehouse operations (e.g., during keyhole maneuvers, as described above in reference to FIG. 2C). In some embodiments, the arm may be designed to reduce mass in order to increase runtime.

In some embodiments, some or all of the above design constraints (as well as additional design constraints) may be implemented in the same robotic arm. Accordingly, some embodiments of a robotic arm may include one or more of the following features: the arm may include a lightweight actuator capable of high specific torque; the arm may be controlled with a high bandwidth control loop with position and torque feedback and minimal backlash; the arm may include joints that are packaged to maximize joint range of motion; the arm may be designed to survive impacts and/or collisions with unexpected obstacles; the arm may be designed to support quick repair and maintenance to maximize uptime; the arm may be capable of reaching into confined spaces; and the vacuum, signal, and power connections to the end effector may be routed effectively while supporting a large range of motion at each joint.

In view of the above functional considerations and potential design choices, the inventors have recognized and appreciated the benefits associated with a robotic arm with differently configured portions, such as differently configured proximal and distal portions. The inventors have recognized that different portions of a robotic arm may be responsible for satisfying different goals and may be subject to different constraints, and that, accordingly, different portions of a robotic arm may be differently designed to best achieve those different goals.

In some embodiments, it may be desirable for a proximal portion of a robotic arm to have high structural stiffness and be capable of generating high torques. The proximal portion of the arm typically does not navigate in tightly constrained environments, and thus may not benefit substantially from high levels of integration and streamlined packaging. Rather, due to certain supply chain and/or maintenance considerations, a proximal arm portion with modular functional units (e.g., separate actuators, bearings, clutches) may be advantageous. For example, including a modular clutch for a proximal joint actuator may enable the fast and easy replacement of the clutch upon failure, significantly decreasing robot downtime compared to a robot with a highly integrated proximal joint that may be associated with labor- and time-intensive disassembly and reassembly to replace a failed clutch.

In some embodiments, a proximal joint of a robotic arm may be modular, and may include removeable and replaceable functional units. For example, a modular proximal joint may have a separate actuator, bearing, encoder, and/or clutch. The modularity of the joint may support ease of assembly and maintenance, while at the same time maximizing the useful life of each individual component. The details of one embodiment of a proximal joint are described below in relation to FIGS. 4A and 4B.

In some embodiments, a distal portion of the robotic arm may be responsible for interacting with the environment, and may frequently operate in tightly constrained spaces. As such, it may be desirable for a distal portion of the arm to be particularly robust to impacts and feature a more integrated and streamlined design compared to the proximal portion of the arm. That is, due to the different demands on the distal portion of the arm compared to the proximal portion of the arm, a highly integrated distal portion of the arm may be more advantageous than a modular distal portion of the arm.

In some embodiments, a distal joint of a robotic arm may be highly integrated and may feature internal routing of connections, thereby improving the ability of the arm to reach into narrow spaces. Without external connections running along the outside of the distal portion of the arm, the arm may be able to navigate a constrained environment more effectively than a conventional arm with external routing of connections that may get caught or snagged on an object in the environment. In some embodiments, a distal joint may include an off-axis actuator, thereby enabling a through-bore for routing of all vacuum, power, and signals to the end effector. This design may enable low profile internal cable routing that may reduce the effective size of the arm. Additionally, this design utilizes the arm structure to provide protection for the cables and avoid failures due to collisions. The details of certain embodiments of a distal joint are described below in relation to FIGS. 5A-6B.

Figure 3:
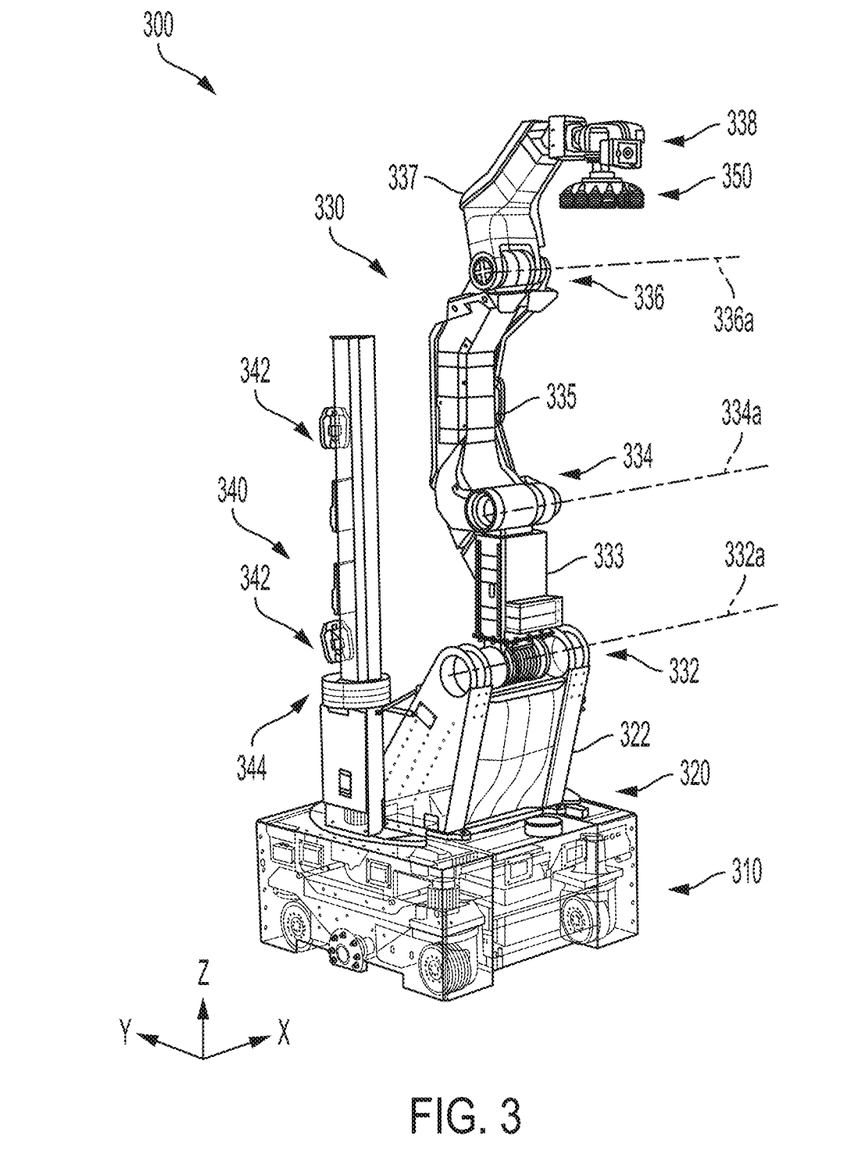
FIG. 3 depicts one embodiment of a robot.

FIG. 3 is a perspective view of a robot 300 designed in accordance with some embodiments. The robot 300 includes a mobile base 310 and a turntable 320 rotatably coupled to the mobile base. A robotic arm 330 is operatively coupled to the turntable 320, as is a perception mast 340. The perception mast 340 includes an actuator 344 configured to enable rotation of the perception mast 340 relative to the turntable 320 and/or the mobile base 310, so that a direction of the perception modules 342 of the perception mast 340 may be independently controlled.

The robotic arm 330 of FIG. 3 is a 6-DOF robotic arm. When considered in conjunction with the turntable 320 (which is configured to yaw relative to the mobile base about a vertical axis parallel to the Z axis), the arm/turntable system may be considered a 7-DOF system. The 6-DOF robotic arm 330 includes three pitch joints 332, 334, and 336, and a 3-DOF wrist 338 which, in some embodiments, may be a spherical 3-DOF wrist. Starting at the turntable 320, the robotic arm 330 includes a turntable offset 322 which is fixed relative to the turntable 320. A distal portion of the turntable offset 322 is rotatably coupled to a proximal portion of a first link 333 at a first joint 332. A distal portion of the first link 333 is rotatably coupled to a proximal portion of a second link 335 at a second joint 334. A distal portion of the second link 335 is rotatably coupled to a proximal portion of a third link 337 at a third joint 336. The first, second, and third joints 332, 334, and 336 are associated with first, second, and third axes 332a, 334a, and 336a, respectively. The first, second, and third joints 332, 334, and 336 are additionally associated with first, second, and third actuators (not labeled) which are configured to rotate a link about an axis. The first, second and third joints 332, 334, and 336 are proximal joints, and are described in greater detail below in reference to FIGS. 4A and 4B. Generally, the nth actuator is configured to rotate the nth link about the nth axis associated with the nth joint. Specifically, the first actuator is configured to rotate the first link 333 about the first axis 332a associated with the first joint 332, the second actuator is configured to rotate the second link 335 about the second axis 334a associated with the second joint 334, and the third actuator is configured to rotate the third link 337 about the third axis 336a associated with the third joint 336. In the embodiment shown in FIG. 3, the first, second, and third axes 332a, 334a, and 336a are parallel (and, in this case, are all parallel to the X axis). In the embodiment shown in FIG. 3, the first, second, and third joints 332, 334, and 336 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. It should be appreciated that a robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

In some embodiments, such as the embodiment of the robot 100 in FIGS. 1A and 1B, the links of the robotic arm may be offset in a horizontal direction. Applying the terminology of FIG. 3 analogously to FIGS. 1A and 1B, the first and second links of the robotic arm 130 of FIGS. 1A and 1B are offset horizontally, compared to the first and second links 333 and 335 of the robotic arm 330 of FIG. 3, which are in-line horizontally. Stated differently, a vertical centerline of the first link of the robotic arm 130 shown in FIG. 1A is not aligned with a vertical centerline of the second link of the robotic arm 130, while a vertical centerline of the first link 333 of the robotic arm 330 shown in FIG. 3 is aligned with a vertical centerline of the second link 335 of the robotic arm 330. The decision to include horizontally in-line or offset links may be based on considerations that include, for example, whether (or how easily) the robot should be able to pull an object (e.g., a box) into a footprint of the arm (or of the mobile base), strength and/or stability considerations, and the degree to which the arm should be able to retract (e.g., offset links may enable a wider range of joint angles before the robotic arm self-intersects).

Returning to FIG. 3, the robotic arm 330 includes a wrist 338. As noted above, the wrist 338 is a 3-DOF wrist, and in some embodiments may be a spherical 3-DOF wrist. The wrist 338 is coupled to a distal portion of the third link 337. The wrist 338 includes three actuators configured to rotate an end effector 350 coupled to a distal portion of the wrist 338 about three mutually perpendicular axes. The three joints of the wrist 338 are distal joints, and are described in greater detail below in reference to FIGS. 5A-6B. Specifically, the wrist may include a first wrist actuator configured to rotate the end effector relative to a distal link of the arm (e.g., the third link 337) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

In some embodiments, a joint actuator may include a brake configured to arrest rotation of the actuator. For example, a brake may be integrated into an actuator, e.g., on an input side of a gearbox. In some embodiments, only proximal joints (e.g., the first, second and third joints 332, 334, and 336) may include actuators with brakes, while the distal joints (e.g., the three joints of the wrist 338) may include actuators without brakes. Based in part on the geometry of the robotic arm, including actuator brakes on only the proximal joints may provide certain benefits relating to weight savings (e.g., by avoiding the distally located mass that would be associated with brakes on the distal portion of the arm), and yet may not be associated with significant limitations. For example, while certain safety considerations may arise if a brake were not included with a proximal actuator (e.g., the inability to stop the arm from imminent collision with an object), a distal actuator without a brake may simply go "limp" in the case of a failure. Referring again to FIG. 3, immediately disabling power to the distal joints associated with the wrist 338 may simply cause the end effector 350 to hang under its own weight with few negative consequences (e.g., with limited possibility of collision with an object), while immediately disabling power to one or more of the proximal joints 332, 334, 336 may cause negative consequences, especially if the arm 330 is in motion and about to collide with an object in its environment. As such, in some embodiments a robotic arm may include actuator brakes for proximal joints but not for distal joints.

Figure 4A:
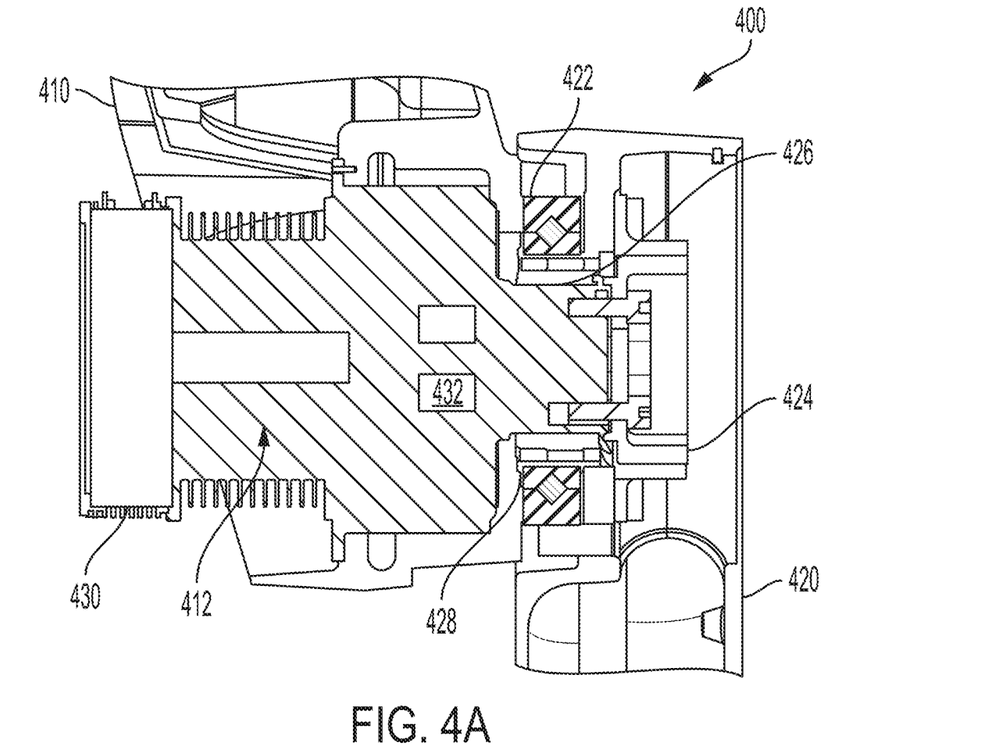
FIG. 4A is a cross-sectional view of one embodiment of a proximal joint of a robotic arm.
Figure 4B:
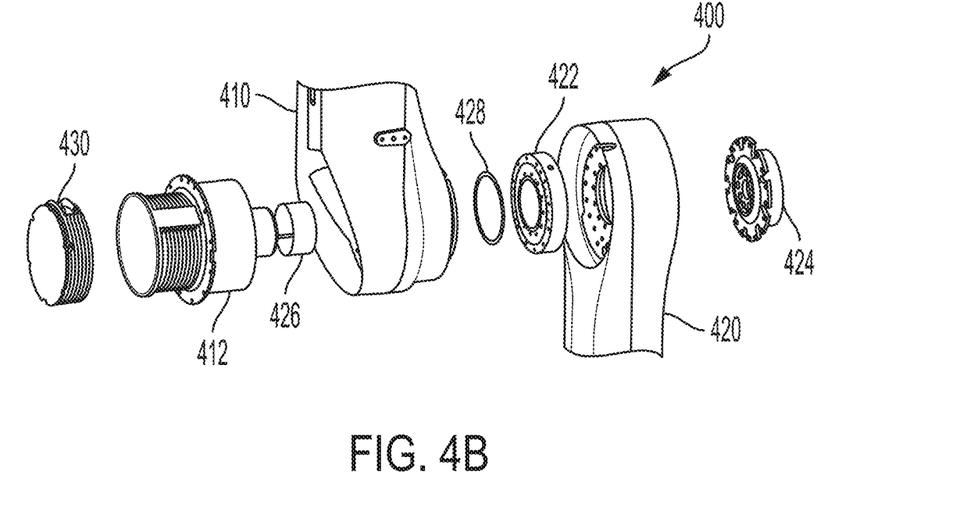
FIG. 4B is an exploded view of the proximal joint of FIG. 4A.

FIGS. 4A and 4B depict one embodiment of a proximal joint 400 of a robotic arm, shown in cross section in FIG. 4A and in an exploded view in FIG. 4B. The joint 400 includes input link 410 and an output link 420 connected by a bearing 422. In some embodiments, the bearing 422 is a cross roller bearing. In some embodiments, the bearing 422 is an axial contact bearing. This structure may increase the potential range of motion of the joint. A sensor 428 is configured to provide information concerning the position of the output link 420 relative to the input link 410. In some embodiments, the sensor 428 is an encoder, e.g., an absolute encoder. In some embodiments, the sensor 428 is mounted to the bearing 422.

The joint 400 includes an actuator 412 with an output that is coupled to an internal diameter of the bearing 422. The actuator 412 is controlled with actuator electronics 430, which may include a motor drive. The actuator 412 may include a brake (e.g., integrated brake 432) configured to arrest rotation of the actuator. The joint 400 utilizes a bushing 426 to minimize any concentricity error between the actuator 412 and the remainder of the joint. An output of the actuator 412 is connected to the output link 420 through a clutch. A clutch may protect the actuator and may enable sizing of the actuator for expected operating loads of the arm rather than for loads associated with impact events (which may be higher). Including a clutch and sizing the actuator for operating loads may save weight and may enable a more dynamic robot design. In some embodiments, a clutch may include a tolerance ring 424.

In some embodiments, the actuator of a proximal joint comprises a brushless motor with a strain wave gearbox, integrated torque sensing, safety brake, and bearing. Utilizing a strain wave gearbox may reduce weight, and may include overload protection in the case of an unexpected impact or sudden load spike on the actuator. In some embodiments, a cycloidal gearbox may be used in place of a strain wave gearbox. In some embodiments, the clutch provides overload protection via a tolerance ring assembly located radially between an output of the actuator and a distal link housing. A tolerance ring assembly may include an inner shaft, the tolerance ring itself, and an outer housing. The tolerance ring may include a split metal ring formed with waves. By pressing the ring together with the housing and the shaft, the ring may be compressed into a small radial gap between the two parts, compressing the waves of the ring and creating a large radial preload force that is sized based on the housing diameter, length, and friction to slip at a given torque. When the input torque exceeds that amount, the ring will slip in the housing. Additionally, the tolerance ring provides compensation for any axial misalignment of the actuator output and output joint.

The modular design of a proximal joint separates specific functional units and allows them to be serviced and replaced individually. Functional units may include bearings, encoders, actuators, actuator electronics, bushings, and/or clutches. A bearing may provide a structural connection between the input and output links. An encoder may provide position feedback for the joint, and may mount directly to a bearing in some embodiments. An actuator may provide the locomotive force and/or torque that moves the joint. In some embodiments, an actuator may integrate a torque sensor and/or a safety brake. Actuator electronics may include a motor drive, and may connect to one or more actuators, sensors, and/or network connections. Actuator electronics may perform real time control of the joint. A bushing may align an actuator with the joint. A clutch may couple an actuator output to an output link, and may provide overload protection to the actuator. Such modularity may enable certain benefits relating to both assembly and service. Additionally, a modular joint may allow for individual components to be used in multiple locations, thereby reducing cost.

The clutch may experience significant wear over time, and may be replaced on a shorter timescale compared to other components or functional units of a joint. Conventional robotic arms with integrated joint designs may integrate the clutch into the actuator. When a clutch is due for service or replacement, a complex overhaul process or an expensive actuator replacement may be the only suitable course of action for a conventional, integrated joint. In contrast, by providing a modular joint design with a modular clutch, the time and cost associated with servicing and/or replacing a clutch can be greatly reduced.

Regarding the transmission, utilizing a strain wave and helical gear set may enable a lightweight, high bandwidth transmission. While alternative configurations of a transmission are available, such alternatives may increase mass or sacrifice joint stiffness, speed, or torque capacity.

In view of the design considerations disclosed above, a robotic arm with modular proximal joints may enable the robot to operate for longer periods of time with less downtime. By reducing the mass of the joint, the effective battery life and/or payload capacity of the arm may be increased. Further, by separating the concerns of the different functional units (rather than distributing functionality across the entire joint), maintenance and service times may be reduced. Further still, the total cost of the arm may be reduced by supporting parallel supply chains.

Figure 5A:
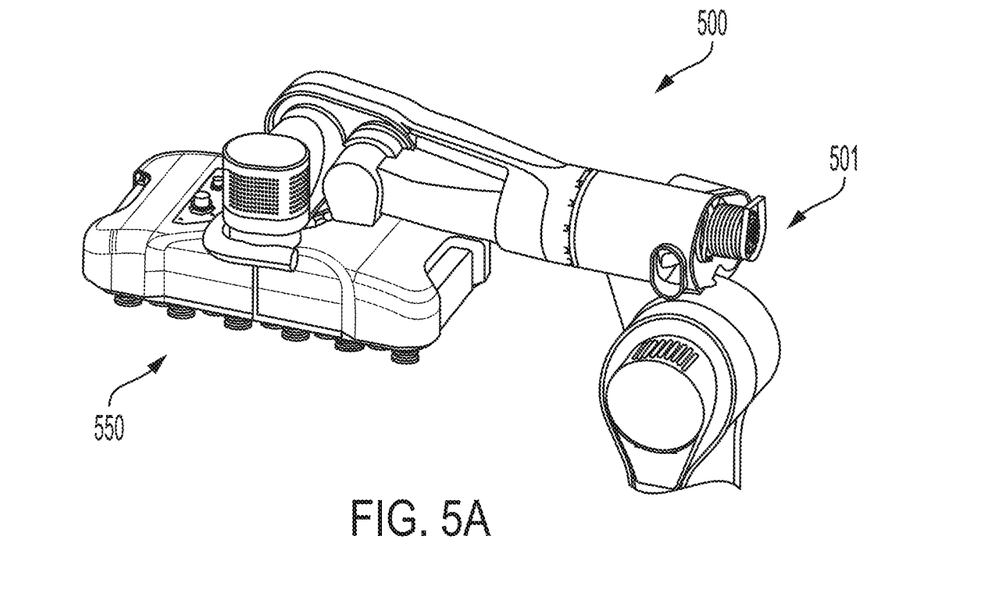
FIG. 5A depicts one embodiment of a distal portion of a robotic arm.
Figure 5B:
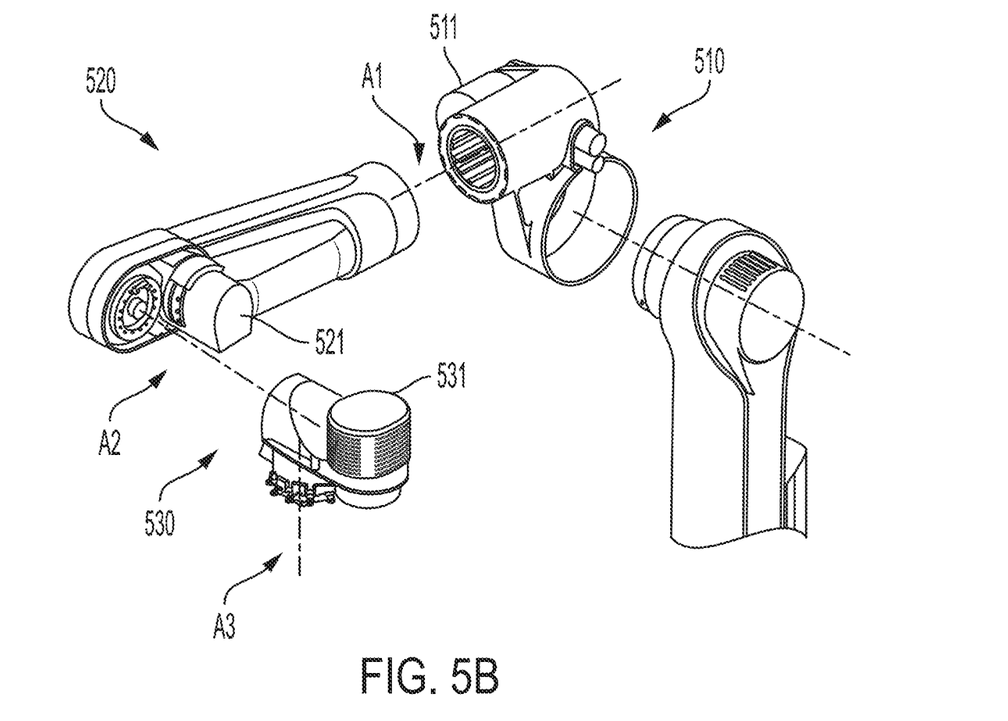
FIG. 5B is an exploded view of the distal portion of a robotic arm of FIG. 5A.

FIG. 5A depicts one embodiment of a distal portion of a robotic arm 500. FIG. 5B depicts an exploded view of the distal portion of the arm 500 of FIG. 5A. The distal portion of the robotic arm 500 includes a wrist comprising three distal joints configured to rotate an end effector 550 about three mutually perpendicular axes. Specifically, the wrist includes a first distal joint 510 with a first distal actuator 511 configured to rotate the end effector 550 about a first wrist axis A1, a second distal joint 520 with a second distal actuator 521 configured to rotate the end effector 550 about a second wrist axis A2, and a third distal joint 530 with a third distal actuator 531 configured to rotate the end effector 550 about a third wrist axis A3. In the embodiment of FIGS. 5A and 5B, the first, second, and third wrist axes are mutually perpendicular and intersect, forming a spherical wrist.

In the embodiment of FIGS. 5A and 5B, the three distal joints include respective distal actuators that are each offset from their respective wrist axis. Specifically, the first distal actuator 511 rotates about an axis that is offset from the first wrist axis A1, the second distal actuator 521 rotates about an axis that is offset from the second wrist axis A2, and the third distal actuator 531 rotates about an axis that is offset from the third wrist axis A3. Offsetting an actuator from an axis of rotation of the associated joint may leave a space through which cables or other connections may be routed, as explained in greater detail below in reference to FIGS. 6A and 6B.

In some embodiments, connections to the end effector (e.g., electrical cables suitable for transferring power and/or data, and/or vacuum cables) are routed through the wrist. For example, in embodiments of the wrist in which the three actuators are offset from their respective axes, cables connecting the end effector to other portions of the robot may be routed through a space within the wrist that includes the intersection point of the three rotation axes of the wrist (in the example of a spherical wrist). In some embodiments of a robotic arm with a vacuum-based end effector, vacuum cables coupled to an end effector are routed through the intersection point of the three rotation axes of the spherical wrist. In some embodiments, the wrist (and/or any other joint of the robotic arm) may include one or more slip rings, such as vacuum slip rings configured to couple a vacuum-based end effector to a vacuum source. In some embodiments, a proximal portion of a robotic arm may include connections (e.g., vacuum, power, data) to the end effector routed externally to the robotic arm, whereas a distal portion of the robotic arm may include connections routed internally to the robotic arm. External routing may be more cost effective and generally a simpler solution when internal routing is not needed. Internal routing may be preferable to protect cables (or other connections) on portions of the arm that are more likely to contact the environment, such as distal portions of the arm (especially during a keyhole maneuver, as described above in relation to FIG. 2C). Cables may transition from being routed externally to being routed internally through a connector on the arm, such as connector 501 of robot 500 in FIG. 5B. It should be appreciated that although the routing of cables is described in some examples herein, the present disclosure is more generally directed to the routing of connections. Types of connections may include, but are not limited to, cables, wires, fibers (e.g., optical fibers), tubing, circuit components (e.g., flexible circuits), or slip rings. Connections may be configured to transmit power, data, signals, vacuum, pressurized fluid, light, or any other suitable media.

Figure 6A:
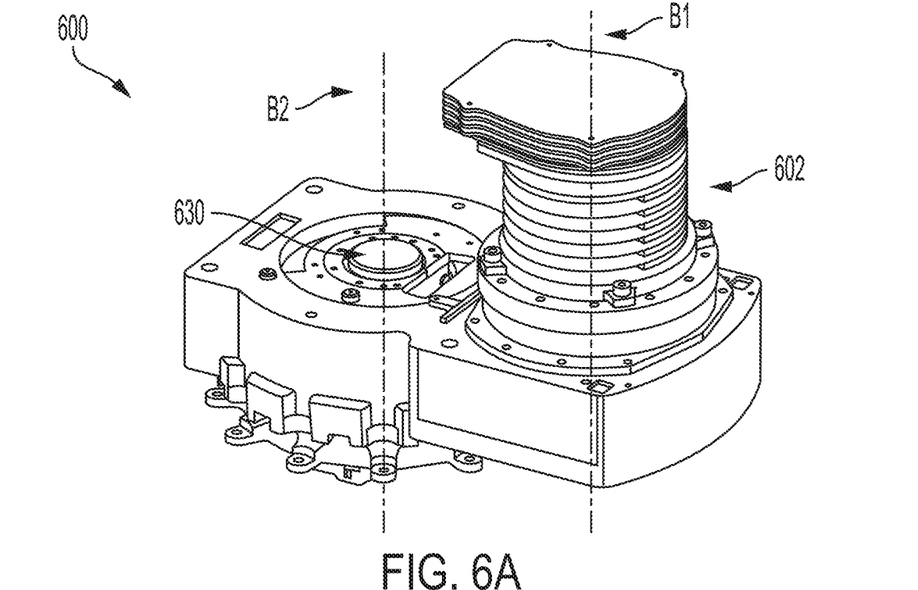
FIG. 6A depicts one embodiment of a distal joint of a robotic arm.
Figure 6B:
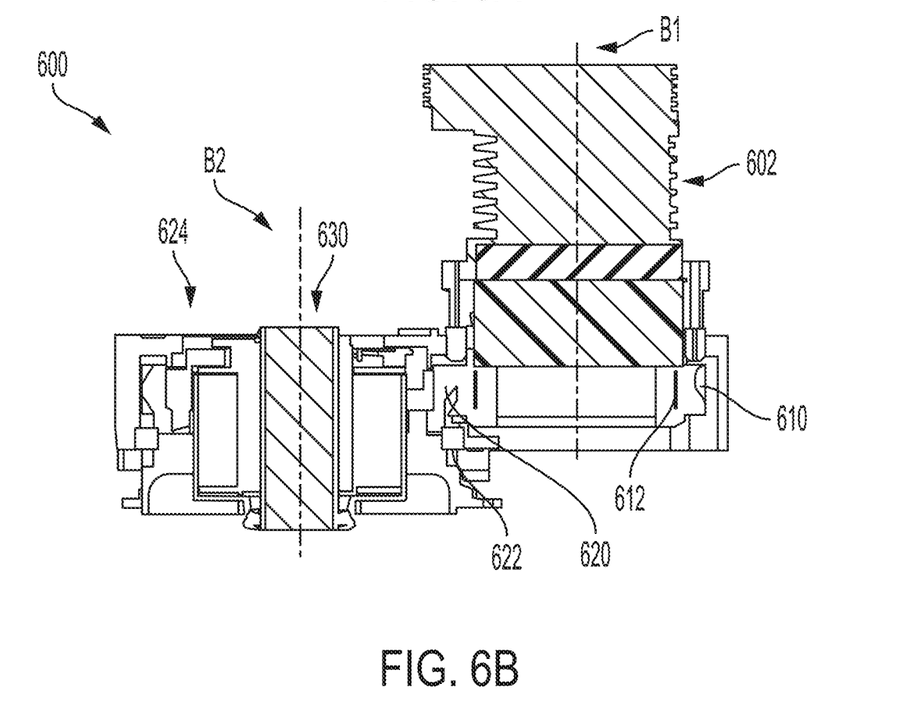
FIG. 6B is a cross-sectional view of the distal joint of FIG. 6A.

FIGS. 6A and 6B depict one embodiment of a distal joint 600 of a robotic arm. The distal joint 600 includes an actuator 602 configured to rotate about an actuator axis B1. In some embodiments, the actuator 602 comprises a brushless motor with a strain wave gearbox, integrated torque sensing, and bearing. In some embodiments, a cycloidal gearbox may be used in place of a strain wave gearbox. An output of the actuator 602 is fixedly coupled to a first gear 610. The first gear 610 is operatively coupled to a second gear 620, such that rotation of the first gear drives rotation of the second gear. The second gear 620 is configured to rotate about a joint axis B2. In some embodiments, the first and second gears are helical gears. By utilizing a helical gear set for the transmission, a distal joint may maintain high bandwidth transmission and minimal backlash.

A tolerance ring 612 is disposed between the output of the actuator 602 and the first gear 610, and serves as overload protection in case of an unexpected impact. Above a threshold torque, the tolerance ring 612 may slip on the internal diameter of the first gear 610. Bushings are used to minimize eccentricity and transfer the reaction load of the helical gear. This minimizes eccentricity and allows for closer gear spacing and thereby reduced backlash.

The second gear 620 includes a through-bore 630, allowing for routing of one or more connections (e.g., vacuum, signal, power) through the second gear 620. As described above, routing one or more connections through an interior portion of a distal joint of a robotic arm may protect the connections from undesirable collisions with the environment, and may avoid failure modes (e.g., snags, damage) that pose challenges for conventional robotic arms with externally routed connections on a distal portion of the arm.

Connected to the second gear 620 is an output bearing 622 and a sensor 624. In some embodiments, the output bearing 622 comprises a cross roller bearing. Utilizing a single cross roller bearing for the second gear may reduce part count and mass. In some embodiments, the output bearing 622 comprises an axial contact bearing. In some embodiments, the sensor 624 comprises an absolute encoder. The absolute encoder attached to the output allows for high bandwidth control of the joint.

As described above, a distal joint with a highly integrated mechanical design may reduce weight and increase the performance capability of a robotic arm. Externally mounted cables (or other connections) on conventional robotic arms are exposed to hazards in the environment. Furthermore, externally mounted cables increase the size of the arm, thereby limiting the space the robot may be capable of reaching into. By reducing potential failures associated with external cabling, the integrated distal joints with internal cable routing described herein reduce costs associated with maintenance and downtime.

Control of one or more of the robotic arm, the mobile base, the turntable, and the perception mast may be accomplished using one or more computing devices located onboard the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A modular joint for coupling a first link of a robotic arm and a second link of the robotic arm, the modular joint comprising:
    an actuator configured to be non-destructively removably coupled to the first link of the robotic arm, the actuator comprising an output shaft configured to rotate about a first axis;
    a bearing configured to be non-destructively removably coupled to the second link of the robotic arm and non-destructively removably coupled to the actuator, the bearing arranged to provide a structural connection between the first link of the robotic arm and the second link of the robotic arm, the structural connection enabling the actuator to be removed from the modular joint without decoupling the bearing from the modular joint, the bearing configured to enable rotation of the second link about the first axis, wherein the output shaft of the actuator is arranged within an internal diameter of the bearing; and
    an encoder configured to measure an angle of the second link relative to the first link.

2. The modular joint of claim 1, wherein the encoder is removably coupled to the bearing.

3. The modular joint of claim 1, further comprising a tolerance ring disposed between an external diameter of the output shaft of the actuator and the second link, the tolerance ring configured to slip relative to the output shaft of the actuator when a torque of the second link exceeds a threshold torque.

4. The modular joint of claim 1, wherein the actuator comprises a brushless motor.

5. The modular joint of claim 1, wherein the bearing comprises a cross roller bearing.

6. The modular joint of claim 1, wherein the actuator comprises a brake configured to arrest rotation of the actuator.

7. The modular joint of claim 1, wherein the actuator comprises a strain wave gearbox.

8. The modular joint of claim 1, wherein the actuator comprises a cycloidal gearbox.

9. The modular joint of claim 1, wherein the bearing comprises an axial contact bearing.

10. The modular joint of claim 1, wherein the encoder is coupled to the bearing.

11. The modular joint of claim 1, wherein
the actuator is configured to be non-destructively removably coupled to the first link using at least one first fastener,
the bearing is configured to be non-destructively removably coupled to the second link using at least one second fastener.

12. The modular joint of claim 1, wherein the actuator is configured to be decoupled from the bearing without the bearing being decoupled from the second link.

\* \* \* \* \*